(12) United States Patent
Masters et al.

(10) Patent No.: US 11,247,939 B2
(45) Date of Patent: Feb. 15, 2022

(54) GLASS BUMPS ON GLASS ARTICLES AND METHODS OF LASER-INDUCED GROWTH

(71) Applicant: Corning Incorporated, Corning, NY (US)

(72) Inventors: Leonard Thomas Masters, Painted Post, NY (US); Alexander Mikhailovich Streltsov, Corning, NY (US)

(73) Assignee: Corning Incorporated, Corning, NY (US)

( * ) Notice: Subject to any disclaimer, the term of this patent is extended or adjusted under 35 U.S.C. 154(b) by 225 days.

(21) Appl. No.: 16/526,472

(22) Filed: Jul. 30, 2019

(65) Prior Publication Data

US 2019/0352228 A1    Nov. 21, 2019

Related U.S. Application Data

(63) Continuation of application No. 14/808,790, filed on Jul. 24, 2015, now abandoned.

(51) Int. Cl.
    *C03C 23/00*        (2006.01)
(52) U.S. Cl.
    CPC ................................. *C03C 23/0025* (2013.01)
(58) Field of Classification Search
    None
    See application file for complete search history.

(56) References Cited

U.S. PATENT DOCUMENTS

| | | | |
|---|---|---|---|
| 1,770,200 | A | 7/1930 | Comstock |
| 4,393,105 | A | 7/1983 | Kreisman |
| 4,683,154 | A | 7/1987 | Benson et al. |
| 5,027,574 | A | 7/1991 | Phillip |
| 5,379,149 | A | 1/1995 | Snitzer et al. |
| 5,399,149 | A | 1/1995 | Snitzer et al. |
| 5,794,404 | A | 8/1998 | Kim |

(Continued)

FOREIGN PATENT DOCUMENTS

| | | |
|---|---|---|
| CN | 201169564 | 12/2008 |
| CN | 101462821 | 6/2009 |

(Continued)

OTHER PUBLICATIONS

South, "Radius of Curvature", http://www.monolithic.org/blogs/engineering/radius-of-curvature, Published Jun. 18, 2009, 5 pages. (Year: 2009).*

(Continued)

*Primary Examiner* — Lisa L Herring

(57) ABSTRACT

A glass article having a glass bump formed integrally thereon by laser-irradiation methods. The glass bump includes a lower region connected to an upper region by an inflection region. The lower region projects from a surface of the glass article and is defined by concavely rounded sides with a radius of curvature R1. The upper region includes a transition portion and a top portion. The transition portion is defined by convexly rounded sides with a radius of curvature R2. The transition portion connects to the lower portion via the inflection region. The upper portion connects to the transition portion and is defined by a convexly rounded top surface with a radius of curvature R3, which is greater than radius of curvature R2.

12 Claims, 11 Drawing Sheets

(56) References Cited

U.S. PATENT DOCUMENTS

| | | | |
|---|---|---|---|
| 5,840,239 A | 11/1998 | Partanen et al. | |
| 5,877,103 A | 3/1999 | Dupont et al. | |
| 6,291,036 B1 | 9/2001 | Wang et al. | |
| RE37,585 E | 3/2002 | Mourou et al. | |
| 6,472,295 B1 | 10/2002 | Morris et al. | |
| 6,541,084 B2 | 4/2003 | Wang | |
| 6,689,241 B1 | 2/2004 | Delhorme et al. | |
| 6,701,749 B2 | 3/2004 | Wang et al. | |
| 6,946,171 B1 | 9/2005 | Aggas | |
| 7,244,325 B2 | 7/2007 | Abate et al. | |
| 7,845,142 B2 | 12/2010 | Thelos | |
| 8,616,023 B2 | 12/2013 | Grzybowski et al. | |
| 8,821,999 B2 | 9/2014 | Grzybowski et al. | |
| 8,955,358 B2 | 2/2015 | Brzybowski et al. | |
| 9,359,252 B1 | 6/2016 | Masters et al. | |
| 2005/0132662 A1 | 6/2005 | Hornung et al. | |
| 2007/0148379 A1 | 6/2007 | Theios et al. | |
| 2007/0201797 A1 | 8/2007 | Grzybowski et al. | |
| 2008/0166570 A1 | 7/2008 | Cooper | |
| 2008/0236052 A1 | 10/2008 | Fleming | |
| 2008/0245011 A1 | 10/2008 | Friedl | |
| 2010/0107525 A1 | 5/2010 | Grzybowski et al. | |
| 2011/0039072 A1 | 2/2011 | Grzybowski et al. | |
| 2012/0247063 A1 | 10/2012 | Grzybowski et al. | |
| 2012/0318777 A1* | 12/2012 | Kwok | B23K 26/0738 219/121.75 |
| 2013/0321903 A1 | 12/2013 | Grzybowski et al. | |

FOREIGN PATENT DOCUMENTS

| | | |
|---|---|---|
| EP | 0283971 | 3/1988 |
| EP | 1077302 | 2/2001 |
| JP | 2002-321941 A | 11/2002 |
| JP | 2003089556 | 3/2003 |
| JP | 2007015908 | 1/2007 |
| JP | 2010-533639 | 10/2010 |
| JP | 2011-519338 | 7/2011 |
| JP | 2012-508335 A | 4/2012 |
| JP | 2014-514233 A | 6/2014 |
| WO | 9424398 | 10/1994 |
| WO | 1999045225 | 9/1999 |
| WO | 2007141583 | 12/2007 |
| WO | 2008002237 | 1/2008 |
| WO | 2010053943 | 5/2010 |

OTHER PUBLICATIONS

Griffiths, et al., "Fabrication of Evacuated Glazing at Low Temperature," Solar Energy, vol. 63, No. 4, pp. 243-249, 1998.

International Search Report and Written Opinion, PCT/US2016/043597, dated Oct. 17, 2016.

Asano, et al., "Vacuum Glazing for Transparent Thermal Insulating Material," Proceedings of 8th Glass Processing Days (2003).

Japanese Patent Application No. 2018-503156 Notice of Grounds for Rejection dated Jun. 26, 2020; 13 Pages; (6 pages of English Translation and 7 pages of Original Document); Japanese Patent Office.

Japanese Patent Application No. 2018-503156, Decision to Grant dated Apr. 7, 2021, 5 pages (2 pages of English Translation and 3 pages of Original Document); Japanese Patent Office.

Antworten, "FAQ / Info VIG + ProVIG", [online]. Retrieved from the Internet: <URL: http://www.vig-info.de/ProjektProVIG/FAQ-VIG.HTM>, (2008), 15 pgs.

Chino, Mike, "Revolutionary Super-Insulating Vacuum Glass!", [online]. Retrieved from the Internet: http://inhabitat.com/2008/03/24/guardian-develops-hyper-insulating-vacuum-glass/>, (Mar. 24, 2008), 9 pgs.

Weinlader, H., et al., "VIG-vacuum insulation glass", In 7th International Vacuum Insulation Symposium Empa, Duebendorf/Zurich, Switzerland, (2005), 197-204.

* cited by examiner

| Model | EvenPolyFit(User) | |
|---|---|---|
| Equation | a+b2*(x-x0)^2+b4*(x-x0)^4+ b6*(x-x0)^6 | |
| Reduced Chi-Sqr | 0.30732 | |
| Adj.R-Square | 0.99951 | |
| | | Value | Standard Err |
| Height | a | 168.47932 | 0.05084 |
| | x0 | 293.18672 | 0.05141 |
| | b2 | -5.76498E-4 | 5.76977E-6 |
| | b4 | -1.94202E-8 | 1.16933E-10 |
| | b6 | 0 | 0 |

| Model | Radius of Curv (User) | |
|---|---|---|
| Equation | y0+sqrt(r^2-(x-x0)^2) | |
| Reduced Chi-Sqr | 0.00159 | |
| Adj.R-Square | 0.9998 | |
| | | Value | Standard Err |
| Height | x0 | 446.21658 | 306.77979 |
| | y0 | -209.5914 | 244.76885 |
| | r | 482.61967 | 396.00029 |

| Model | NewFunction (User) | |
|---|---|---|
| Equation | b+(c^2-(x-a)^2)^0.5 | |
| Reduced Chi-Sqr | 0.05949 | |
| Adj.R-Square | 0.55154 | |
| | Value | Standard Err |
| Smoothed Y1  a | 295.66874 | 1.46217 |
| b | -2397.15874 | 212.68633 |
| c | 2564.72915 | 212.66168 |

| Model | NewFunction (User) | |
|---|---|---|
| Equation | b+(c^2-(x-a)^2)^0.5 | |
| Reduced Chi-Sqr | 0.21547 | |
| Adj.R-Square | 0.8666 | |
| | Value | Standard Err |
| Smoothed Y1  a | 294.12202 | 0.73247 |
| b | -907.57472 | 33.17153 |
| c | 1075.493 | 33.1311 |

GLASS BUMPS ON GLASS ARTICLES AND METHODS OF LASER-INDUCED GROWTH

CROSS REFERENCE TO RELATED APPLICATIONS

This application claims the benefit of priority under 35 U.S.C. § 119 of Non-Provisional U.S. application Ser. No. 14/808,790 filed on Jul. 24, 2015 the content of which is relied upon and incorporated herein by reference in its entirety.

BACKGROUND

The present disclosure relates to a glass bump formed on a glass article by methods of laser-irradiating the glass article.

SUMMARY

According to one embodiment of the present disclosure, a glass article having a glass hump thereon is disclosed. The glass bump comprises a lower region and an upper region connected by an inflection region. The lower region comprises a diameter D1 defined by concavely rounded sides. The lower region projects from the surface of the glass article. The diameter D1 is the glass bump maximum diameter. The concavely rounded sides have a radius of curvature R1 and join with the glass article surface. The upper region of the glass bump comprises a transition portion and a top portion. The transition portion comprises a diameter D2 defined by convexly rounded sides, diameter D2 is less than diameter D1. The convexly rounded sides have a radius of curvature R2. The top portion comprises a diameter D3 defined by a convexly rounded top surface joining with convexly rounded sides converging from the transition portion. The convexly rounded top surface has a radius of curvature R3 form about 900 microns to about 2600 microns, greater than radius of curvature R2. Diameter D3 is less than diameter D2. The convexly rounded top surface is spaced apart from the glass article surface defining a height H of the glass bump.

According to another embodiment of the present disclosure, a glass pane including a glass bump formed on a surface of the glass pane by a method is disclosed. According to the method, the glass pane surface is irradiated with laser irradiation converging through a lens from a laser irradiation source at a distance from about 1 millimeter to about 2.5 millimeters away from the glass pane surface opposite the laser irradiation source. The laser irradiation locally heats and induces growth of the glass bump from the glass pane. The method is free of a glass bump growth-limiting structure. The glass bump comprises a lower region and an upper region connected by an inflection region. The lower region comprises a volume V1 and a diameter D1 defined by concavely rounded sides. The lower region projects from the surface of the glass pane. The diameter D1 is the glass bump maximum diameter. The concavely rounded sides have a radius of curvature R1 and join with the glass pane surface. The upper region of the glass bump comprises a volume V2 having a transition portion and a top portion. The transition portion comprises a diameter D2 defined by convexly rounded sides, diameter D2 is less than diameter D1. The convexly rounded sides have a radius of curvature R2. The top portion comprises a diameter D3 defined by a convexly rounded top surface joining with convexly rounded sides converging from the transition portion. The convexly rounded top surface has a radius of curvature R3 from about 900 microns to about 200 microns, greater than radius of curvature R2. Diameter D3 is less than diameter D2. The convexly rounded top surface is spaced apart from the glass pane surface defining a height H of the glass bump.

According to yet another embodiment of the present disclosure, a method of making an article having a glass bump thereon is disclosed. The glass article is a glass pane with a surface. According to the method, the glass pane surface is irradiated for a time to locally heat and induce growth of the glass bump from the glass pane. The laser radiation converges with a numerical aperture from about 0.01 to about 5 from a laser radiation source through a lens. The laser irradiation converges at a distance from about 1 millimeter to about 2.5 millimeters away from the glass pane surface opposite the laser irradiation source. The method is free of a glass bump growth-limiting structure. The glass bump comprises a lower region and an upper region connected by an inflection region. The lower region comprises a diameter D1 defined by concavely rounded sides. The lower region projects from the surface of the glass pane. The diameter D1 is the glass bump maximum diameter. The concavely rounded sides have a radius of curvature R1 and join with the glass pane surface. The upper region of the glass bump comprises a transition portion and a top portion. The transition portion comprises a diameter D2 defined by convexly rounded sides, diameter D2 is less than diameter D1. The convexly rounded sides have a radius of curvature R2. The top portion comprises a diameter D3 defined by a convexly rounded top surface joining with convexly rounded sides converging from the transition portion. The convexly rounded top surface has a radius of curvature R3 form about 900 microns to about 2600 microns, greater than radius of curvature R2. Diameter D3 is less than diameter D2. The convexly rounded top surface is spaced apart from the glass pane surface defining a height H of the glass bump.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

DETAILED DESCRIPTION

Figure 1:
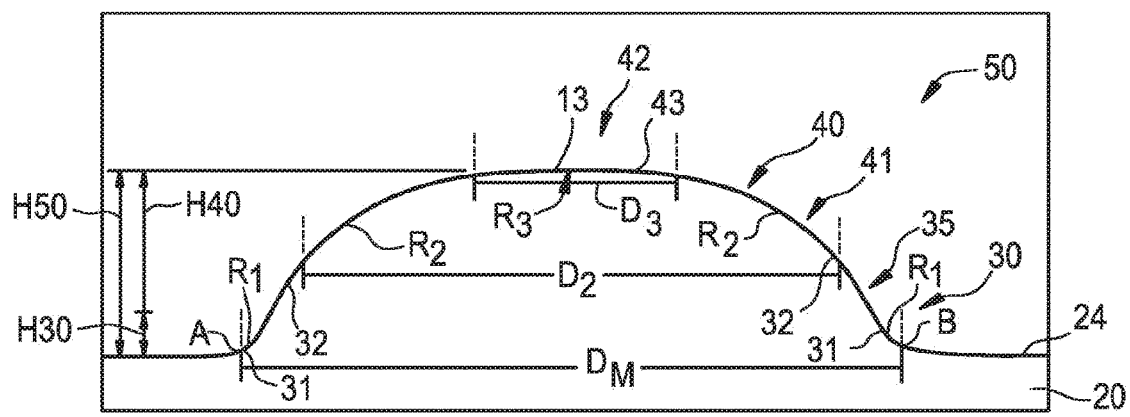
FIG. 1 is a close-up cross-sectional view of an example glass bump 50 formed according to the present methods.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

A glass article of the present disclosure includes a surface and can have any shape. In one example, the glass article can be round, spherical, curved, or flat. In another example the glass article can be relatively thick (about 10 cm) or relatively thin (about 0.1 microns). In yet another example, the glass article has a thickness between about 0.5 millimeters and about 3 millimeters (e.g., 0.5, 0.7, 1, 1.5, 2, 2.5, or 3 millimeters). In one embodiment, the glass article is comprised of a plurality of individual glass components joined or fused together (e.g., multiple square glass articles joined or fused together to a larger glass article). In an exemplary embodiment, the glass article is a glass pane 20 made of a glass material and top and bottom surfaces and an outer edge. Glass pane 20 of the present disclosure may be substantially flat across its surfaces and may have a rectangular shape.

The glass article of the present disclosure may be formed from soda-lime glass, borosilicate glass, aluminosilicate glass, or an alkali aluminosilicate glass. Other suitable and available glasses and applicable compositions are disclosed, for example, in U.S. Patent Publication No. 2012/0247063, the contents of which are incorporated by reference herein.

The glass article of the present disclosure comprises at least one to a plurality of glass bumps 50. In one embodiment, the glass bumps are grown from the surface of the glass article by a laser-irradiation process. Glass bumps 50 of the present disclosure may be used as spacers between parallel, opposing panes of glass in a vacuum-insulated glass (VIG) window. In a VIG window, glass bumps 50 maintain the distance between the opposing glass panes that have a tendency to bow together under the force of vacuum pressure there between and external atmospheric pressure and external forces (e.g., weather). The distance between the parallel, opposing panes of glass in VIG window is substantially equivalent to the heights of the glass bumps. The glass bumps of the present disclosure are configured to minimize heat transfer through the window and reduce stress on individual glass bumps 50 and correspondingly on the opposing glass pane contacting glass bumps 50.

In an exemplary embodiment, the glass article (e.g., glass pane) includes a glass bump having a top surface radius of curvature greater than the side(s) radius of curvature. That is, the radius of curvature for the sides of the glass bump extending up from the glass article surface is smaller than the radius of curvature of the top surface. A convex top surface having a radius of curvature larger than the convex side walls may optimize contact between glass bump 50 and an opposing glass pane. That is, as the pressure increases between opposing panes in a VIG window (thereby transferring that force onto glass bumps 50) the opposing glass pane may deform slightly and contact a greater area of the glass bump top surface (e.g., 3% of the glass bump height). Likewise, when pressure decreases between opposing panes in a VIG window, the opposing glass pane contacts a smaller area on the glass bump top surface (e.g., 1% of the glass bump height). Accordingly, the radius of curvature along the top surface of glass bump 50 of the present disclosure provides benefits as compared to conventional glass bumps. In another example, glass bumps 50 may act as spacers between the glass article and other materials. In yet another example, glass bumps 50 may have aesthetic advantages. Conventional glass bumps with a top surface radius of curvature greater than 2600 microns have a large area of contact with opposing panes in a VIG window enabling and creating a larger heat transfer area. Conventional glass bumps with a top surface radius of curvature less than 900 microns have a small area of contact with opposing panes in a VIG window which may cause stress at the small contact area on the opposing pane and can lead to surface defects.

Glass bumps 50 may be grown out of a body portion 23 of the glass article and formed from the glass material making up the glass article, so as to outwardly protrude in a convex manner. Glass bumps 50 are comprised of substantially the same glass composition as the glass article. In one embodiment, the glass article is comprised of a plurality of individual glass components, each glass component including at least one locality L and/or at least one glass bump 50. The plurality of glass bumps 50 may include any number of glass bumps including as few as 20, 15, 10, or 5 glass bumps. In an example embodiment, glass bumps 50 are regularly spaced apart on the glass article with respect to each other. Distances between the glass bumps may be from about 1 mm (about 1/25 of an inch) to about 25 centimeters (about 10 inches), or from about 1 centimeter (about 0.4 inches) to about 15 centimeters (about 6 inches). Spacing the glass bumps closer together reduces stress concentration on individual bumps in a VIG window. In another embodiment, the glass bumps are irregularly or randomly spaced apart on the glass article with respect to each other.

Referring to FIG. 1, an example close-up cross-sectional view of an example glass bump 50 on glass pane 20 is shown. Glass bump 50 includes a lower region 30 and an upper region 40 connected by an inflection region 35. Glass bump 50 has a height H50 measured from surface 24 of glass pane 20 to a terminal point 13. Terminal point 13 is a location on glass bump 50 at the furthest distance from the surface 24 of glass pane 20. In one embodiment, terminal point 13 may be an area on glass bump 50. Height H50 of glass bump 50 may range from 50 microns to 200 microns, or from 75 microns to 150 microns, or even from 100 microns to 120 microns in exemplary embodiments. Note that if bump heights H50 are too small, the gap between opposing plates in a VIG window is reduced and, therefrom, a reduced vacuum space between opposing panes and reduced insulating properties. In addition, small glass bump 50 heights H50 can lead to the appearance of optical rings due to light interference between closely arranged glass surfaces.

Lower region 30 of glass bump 50 projects from surface 24 of glass pane 20 and is integrally formed thereon. Lower region 30 has a height H30 that may extend from about 5% to about 25% of glass bump 50 height H50. Lower region 30 includes a volume V1 and a diameter D1 defined by concavely rounded sides 31. Volume V1 may be from about $9.42 \times 10^5$ cubic microns to about $2.51 \times 10^7$ cubic microns. Diameter D1 may be the maximum diameter DM of glass bump 50. That is, maximum diameter DM is the distance between the points A and B where concavely rounded sides 31 terminate and join with surface 24 of glass pane 20. Maximum diameter DM may be from about 400 microns to about 800 microns, or even 500 microns to 700 microns. Glass bumps 50 with maximum diameter DM smaller than 400 microns may have a top surface with a radius of curvature less than 750 microns which increases stress concentration on opposing glass panes in a VIG window. Glass bumps 50 with diameter D1 larger than 800 microns may be visible when used between glass panes in a VIG window.

Figure 2:
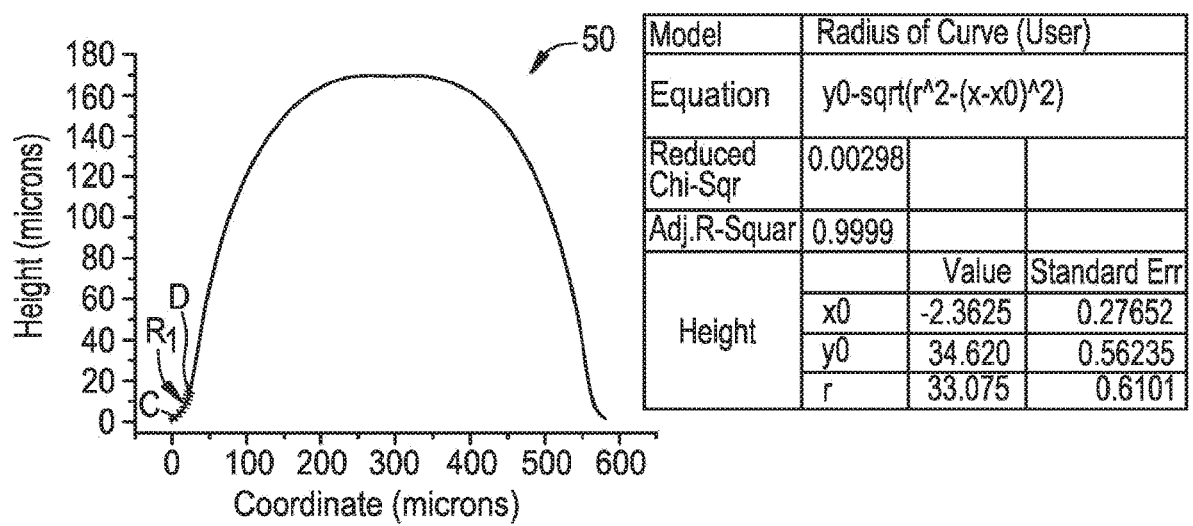
FIG. 2 is close-up cross-sectional view of the example glass bump 50 from FIG. 1 fit with a radius of curvature equation along its concavely rounded side wall.

Concavely rounded sides 31 of lower region 30 include a radius of curvature R1. Concave radius of curvature R1 may be from about 25 microns to about 100 microns. Radius of curvature R1 may vary slightly within the disclosed range at different locations around glass bump 50. Radius of curvature R1 is configured such that glass bump 50 projects from glass pane 20 surface 24 so as not to exceed the disclosed range for diameter D1 and to maintain a top surface radius of curvature as disclosed herein. FIG. 2 illustrates a close-up cross-sectional view of an example glass bump 50. Example glass bump 50 height H50 is about 168 microns with maximum diameter DM at about 586 microns. As shown in FIG. 2, radius of curvature R1 is about 33 microns measured from coordinate (1 micron, 1 micron) C to coordinate (22 microns, 13 microns) D along one concavely rounded side 31 of glass bump 50.

Figure 3:
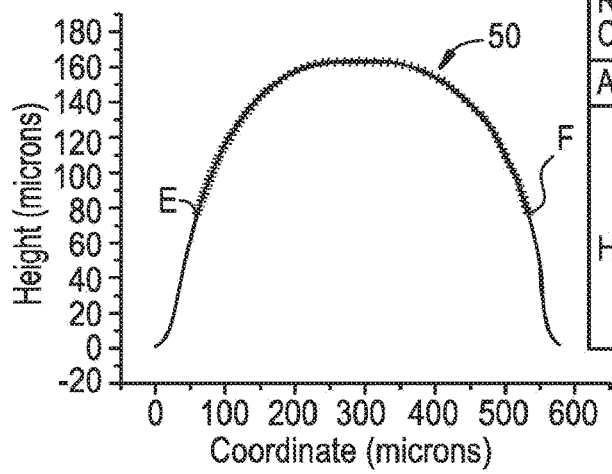
FIG. 3. is close-up cross-sectional view of the example glass bump 50 from FIG. 1 fit with a polynomial function along its upper region.

Referring back to FIG. 1, inflection region 35 of glass bump 50 connects lower region 30 and upper region 40. Upper region 40 includes a volume V2 having a transition portion 41 and a top portion 42. Upper region 40 has a height H40 that may extend from about 75% to about 95% of glass bump 50 height H50. Volume V2 may be from about $1.41 \times 10^7$ cubic microns to about $9.55 \times 10^7$ cubic microns. In one embodiment, volume V2 is greater than volume V1 in glass bump 50. In another embodiment, volume V2 is greater than volume V1 by at least 5%, but up to 50%. In another embodiment, volume V2 extends from about 85% to about 92% of glass bump 50 diameter D1. In yet another embodiment, a lateral profile (i.e., the cross-sectional view shown in FIG. 1) of upper region is represented by a $4^{th}$ power polynomial function having the formula $y=-1.94 \times 10^{-8} x^4 + -5.76 \times 10^{-4} x^2 + 168.47$ with a coefficient of determination form about 0.95 to about 0.999. The coefficients for this $4^{th}$ power polynomial function may vary by up to 5%. FIG. 3 illustrates this polynomial function fit to a portion of the upper region an example glass bump 50 of the present disclosure with a coefficient of determination of about 0.999. The polynomial function is fit to the lateral profile of upper region 40 of an example glass bump 50 from coordinate E at (55 microns, 78 microns) to coordinate F at (531 microns, 78 microns) along the lateral profile of glass bump 50. That is, the polynomial function may fit at least 40%, but up to 60%, of the upper region of the lateral profile of glass bump 50.

Figure 4:
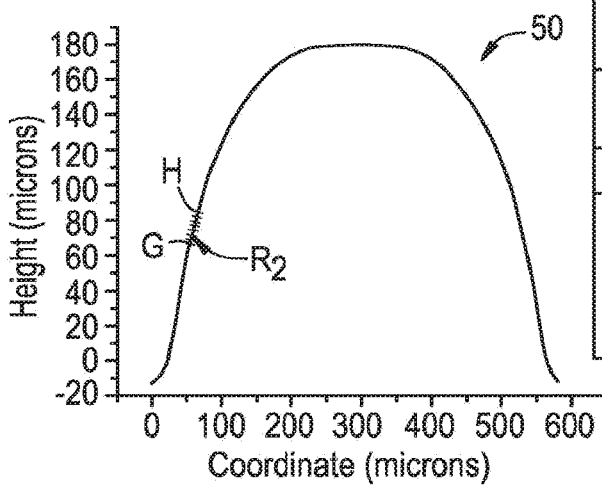
FIGS. 4-6 are close-up cross-sectional views of the example glass bump 50 from FIG. 1 fit with a radius of curvature equation along different segments of one of its convexly rounded side walls.
Figure 5:
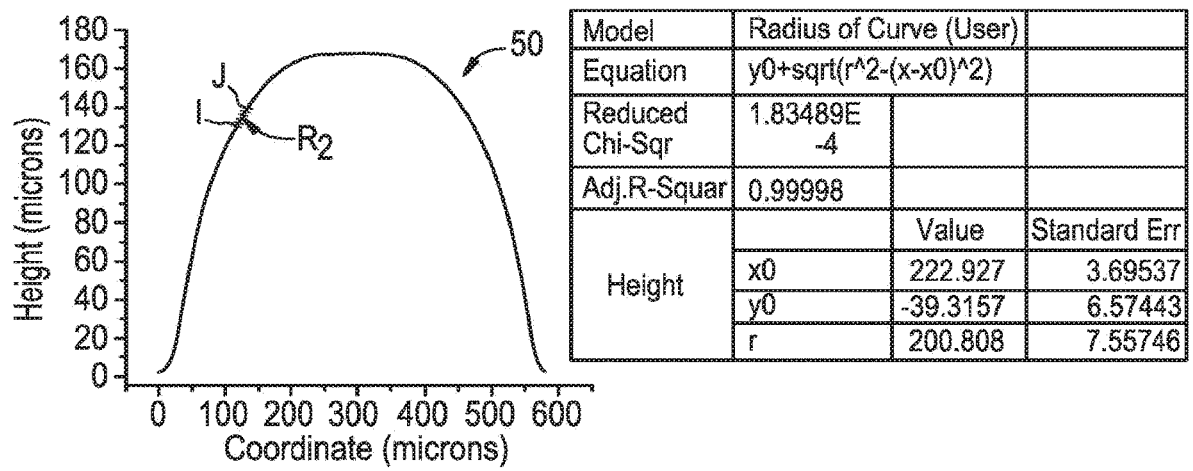
Figure 6:
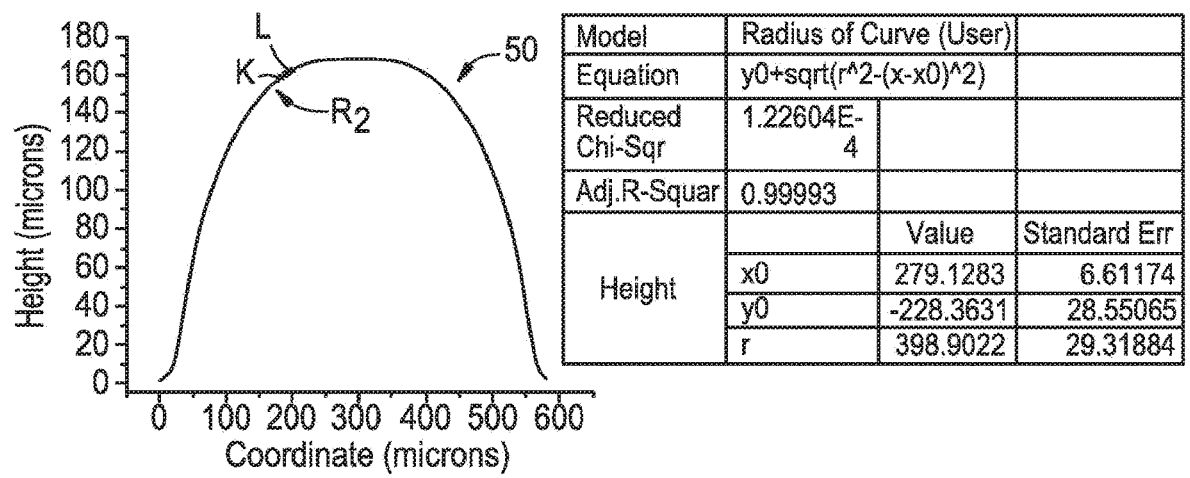

Referring back to FIG. 1, transition portion 41 of upper region 40 includes a diameter D2 defined by convexly rounded sides 32. Diameter D2 may extend from about 33% to about 85% of the maximum diameter DM of glass bump 50. Convexly rounded sides 32 join with concavely rounded sides 31 extending up from lower region 30 at inflection region 35. Convexly rounded sides 32 have a radius of curvature R2. Convex radius of curvature R2 may be from about 175 microns to about 850 microns, or about 200 microns to about 500 microns, and may vary slightly within the disclosed range at different locations around glass bump 50. FIGS. 4-6 illustrate a close-up cross-sectional view of example glass bump 50. In each of FIGS. 4-6, glass bump 50 is fit with a radius of curvature equation along one of convexly rounded side walls 32 in transition portion 41 with coefficient of determination (i.e., r-squared) greater than 0.999. In FIG. 4, radius of curvature R2 is about 483 microns measured from coordinate G at (56 microns, 76 microns) to coordinate H at (64 microns, 84 microns) along one of convexly rounded side walls 31 of glass bump 50. In FIG. 5, radius of curvature R2 is about 201 microns measured from coordinate I at (115 microns, 130 microns) to coordinate J at (133 microns, 140 microns) along one of convexly rounded side walls 31 of glass bump 50. In FIG. 6, radius of curvature R2 is about 399 microns measured from coordinate K at (179 microns, 158 microns) to coordinate L at (198 microns, 162 microns) along one of convexly rounded side walls 31 of glass bump 50.

Radius of curvature R2 may be measured over at least 5 microns or 5% of glass bump 50 height 1150. Alternatively, R2 may be measured at or over 50% glass bump 50 height H50. Diameter D2, measured between convexly rounded sides 32, may be from about 132 microns to about 680 microns. Diameter D2 of transition portion 41 decreases by about 15% to about 65% from inflection region 35 to top portion 42. Diameter D2 is less than diameter D1 since the total diameter of glass bump 50 gradually decreases from lower region to transition portion 41.

Figure 7:
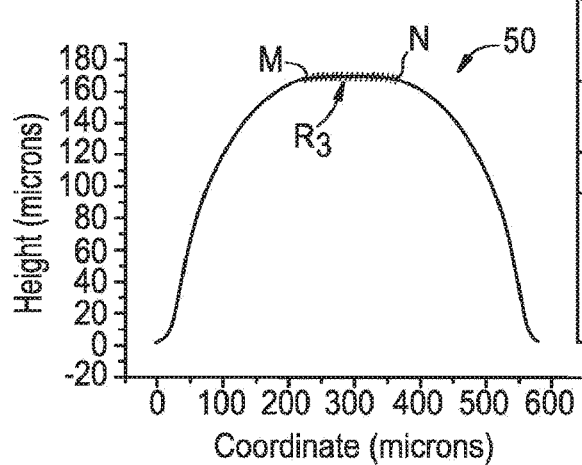
FIGS. 7-8 are close-up cross-sectional views of the example glass bump 50 from FIG. 1 fit with a radius of curvature equation along different heights of its convexly rounded top surface.
Figure 8:
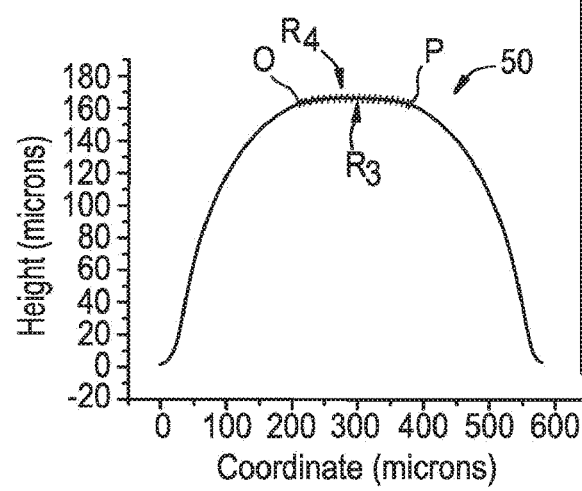

Referring back to FIG. 1, top portion 42 includes a diameter D3 and is defined by a convexly rounded top surface 43. Convexly rounded top surface 43 is spaced apart from glass pane 20 surface 24 defining height H50 of glass bump 50. Convexly rounded top surface 43 may extend from about 1% to about 3% of glass bump 50 height H50. In other embodiments, convexly rounded top surface 43 may extend from about 15% to about 35% of maximum diameter DM, or about 20% to about 33% of maximum diameter DM. Convexly rounded top surface 43 joins with convexly rounded sides 32 converging from transition portion 41. Convexly rounded top surface 43 has a convex radius of curvature R3 from about 900 microns to about 2600 microns, or about 950 microns to about 2000 microns. FIGS. 7-8 illustrate a close-up cross-sectional view of example glass bump 50. In FIGS. 7-8, glass bump 50 is fit with a radius of curvature equation along convexly rounded top surface 43 in top portion 42.

In FIG. 7, radius R3 is about 2564 microns measured from coordinate M at (225 microns, 166 microns) to coordinate N at (361 microns, 166 microns) along convexly rounded top surface 43 of glass bump 50. Radius R3 from coordinate M to N extends 1% of height H50 of glass bump 50. In FIG. 8, convex radius R3 is about 1075 microns measured from coordinate O at (211 microns, 163 microns) to coordinate P at (375 microns, 163 microns) along convexly rounded top surface 43 of glass bump 50. Radius R3 from coordinate O to P extends 3% of height H50 of glass bump 50. In FIGS. 7-8, convexly rounded top surface 43 includes slight imperfections or "noise" along rounded top surface 43 created by limitations within the optical scanning profilometer used to show the lateral profile of glass bump 50. Accordingly, close fit curves have a coefficient of determination (i.e., r-squared) greater than 0.55, or even 0.85. In alternative embodiments, convexly rounded top surface 43 includes a slight concave area with a concave radius of curvature R4 greater than about 3500 microns and less than 5000 microns at or around terminal point 13.

Radius of curvature R3 is configured with a radius of curvature such that contact between opposing glass panes in a VIG window is sufficient to alleviate stress on individual glass bumps 50 and the opposing glass panes, and also limited to minimize contact heat transfer between the opposing panes through glass bump 50. Radius of curvature R3 is such that is can be formed by a laser irradiation process of the present disclosure without the use of a growth-limiting structure. The laser-irradiation process of the present disclosure, free of a growth-limiting structure, presents significant time savings for growing glass bumps 50 with a large radius of curvature (i.e., from 900 microns to 2600 microns) on its top surface as compared to conventional methods. Specifically, the need to align the glass article relative to the growth-limiting structure before growing glass bump 50 via laser-irradiation is eliminated.

In an exemplary embodiment, convex radius of curvature R3 is greater than convex radius of curvature R2. In another embodiment, R3 is greater than R2 by about 80% to about 300%, or about 100% to about 250%. In yet another embodiment, convex radius of curvature R3 is greater than concave radius of curvature R1. Diameter D3, measured as a chord on convexly rounded top surface 43, is less than diameter D2. Diameter D3 at its maximum may be from about 132 microns to about 264 microns. Diameter D3 decreases incrementally to a point at or around termination point 13.

Transition portion 41 and top portion 42 are integrally formed together. Further, inflection region 35 connects the lower region 30 and upper region 40 at transition portion 41. Inflection region 35 may be defined by sides without a radius of curvature (i.e., flat or perpendicular to surface 24). In one embodiment, inflection region 35 is a 2-dimensional area (e.g., a plane). In another embodiment, inflection region 35 is a volume V4 extending at most about 5% of glass bump 50 height H50.

Figure 9:
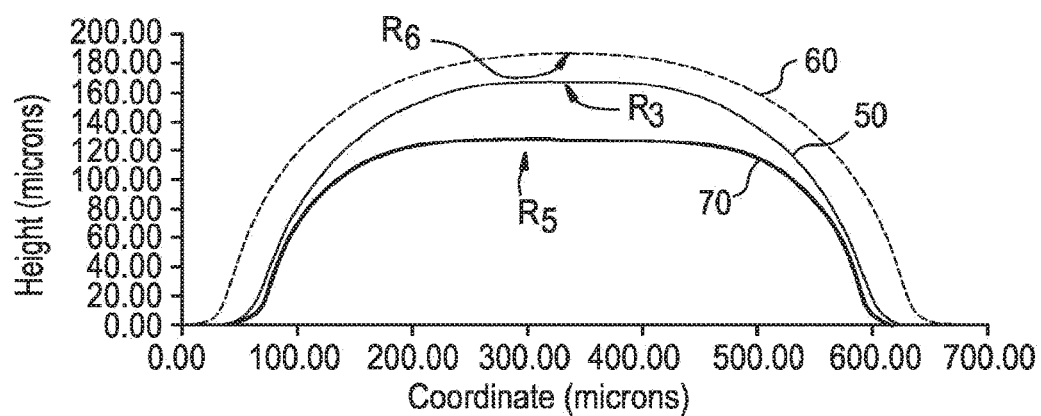
FIG. 9 is a close-up cross-sectional view of the example glass bump 50 from FIG. 1 overlaid with close-up cross-sectional views of hemispherical glass bump 60 and conventional "flat-top" glass bump 70.

Glass bump 50 as described above and according to the present disclosure is different than conventional glass bumps grown according to conventional methods. Referring to FIG. 9, a close-up cross-sectional view of example glass bump 50 of the present disclosure is illustrated. Also provided are conventional glass bumps 70 and 60 manufactured by methods different than the present disclosure. Close-up cross-sectional view of glass bump 70 in FIG. 9 is grown according to conventional laser-irradiation methods including a growth-limiting structure. For example, U.S. Patent Publication No. US 2013/0321903A1 provides a method of growing a plurality of growth-limited glass bump 70 which has "a substantially flat top portion."

Figure 10:
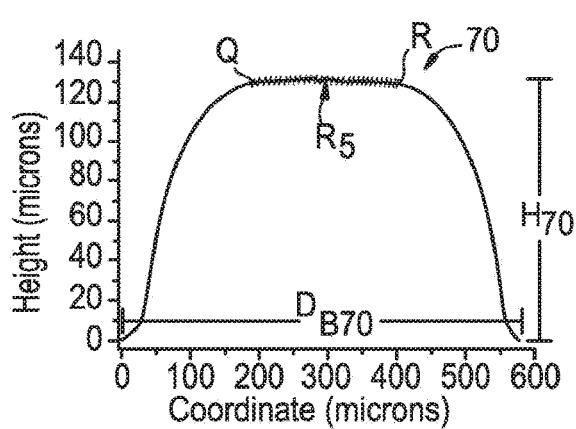
FIGS. 10-11 are close-up cross-sectional views of an example conventional "flat-top" glass bump 70 fit with a radius of curvature equation along different heights of its convexly rounded top surface.
Figure 11:
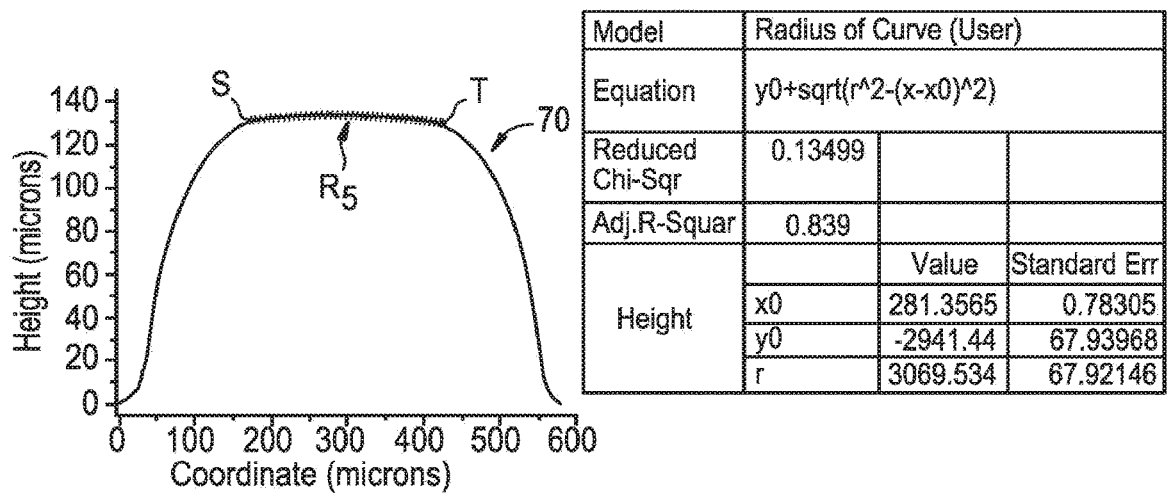
Figure 12:
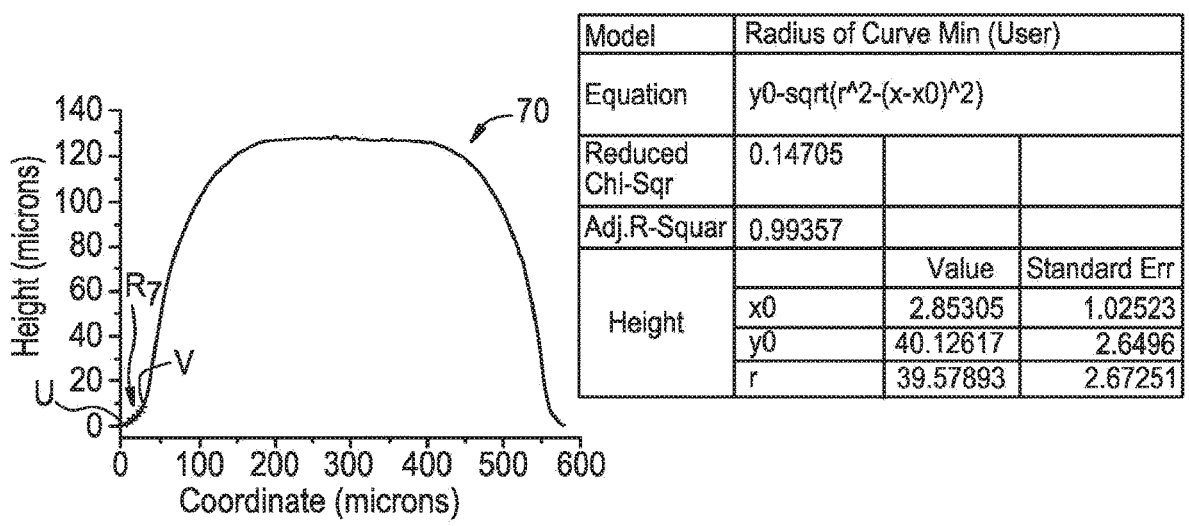
FIG. 12 is close-up cross-sectional view of an example conventional "flat-top" glass bump 70 fit with a radius of curvature equation along its concavely rounded side wall.
Figure 13:
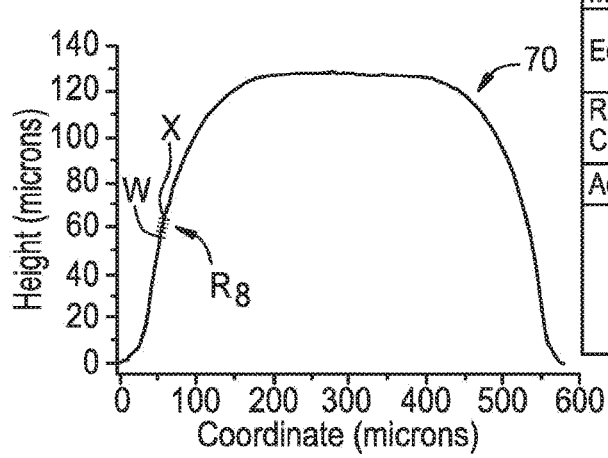
FIGS. 13-15 are close-up cross-sectional views of an example conventional "flat-top" glass bump 70 fit with a radius of curvature equation along different segments of one of its convexly rounded side walls.
Figure 14:
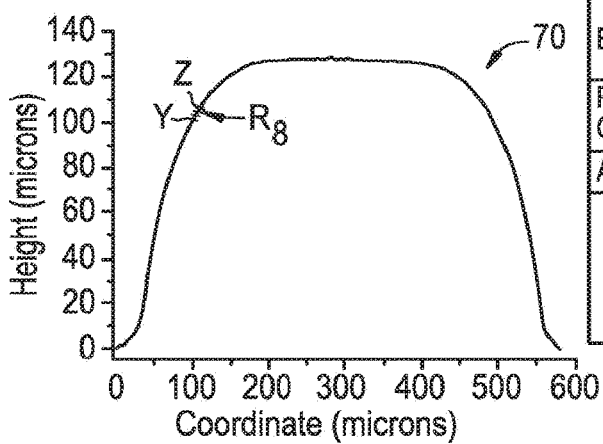
Figure 15:
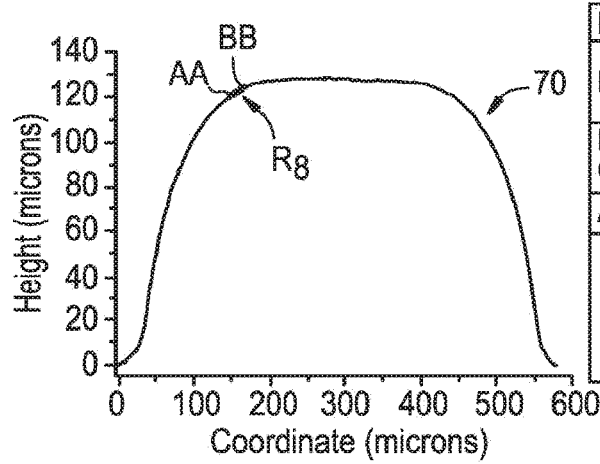

Glass bump 70 in FIG. 9 is further illustrated in FIGS. 10-15. Example glass bump 70 in FIGS. 10-15 has a height H70 of about 128 microns and a base diameter DB70 of about 562 microns. As shown in FIG. 10, glass bump 70 has a radius of curvature R5 of about 4142 microns measured from coordinate Q at (189 microns, 128 microns) to coordinate R at (401 microns, 128 microns) along glass bump 70 top surface. Radius R5 from coordinate Q to R extends 1% of height H70 of glass bump 70. As shown in FIG. 11, glass bump 70 has a radius of curvature R5 of about 3069 microns measured from coordinate S at (170 microns, 125 microns) to coordinate T at (421 microns, 125 microns) along glass bump 70 top surface. Radius R5 from coordinate S to T extends 3% of height H70 of glass bump 70. As shown in FIG. 12, glass bump 70 has a radius of curvature R7 of about 40 microns measured from coordinate U at (1 micron, 1 micron) to coordinate V at (32 microns, 14 microns) along one of its concavely rounded sides. As shown in FIG. 13, glass bump 70 has a radius of curvature R8 of about 4047 microns measured from coordinate W at (53 microns, 58 microns) to coordinate X at (59 microns, 63 microns) along on of its convexly rounded sides. As shown in FIG. 14, glass bump 70 has a radius of curvature R8 of about 2977 microns measured from coordinate Y at (100 microns, 101 microns) to coordinate Z at (105 microns, 105 microns) along one of its convexly rounded sides. As shown in FIG. 15, glass bump 70 has a radius of curvature R8 of about 643 microns measured from coordinate AA at (150 microns, 120 microns) to coordinate BB at (160 microns, 124 microns) along one of its convexly rounded sides. In FIGS. 10-15, convexly rounded top surface includes slight imperfections or "noise" along convex radius of curvature R5 created by limitations within the optical scanning profilometer used to show the lateral profile of glass bump 70.

Figure 16:
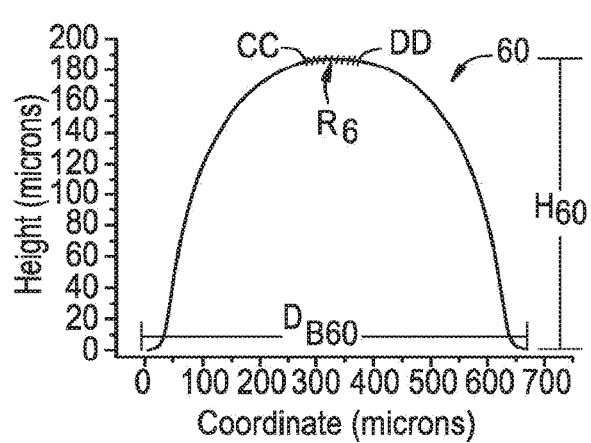
FIGS. 16-17 are close-up cross-sectional views of an example hemispherical glass bump 60 fit with a radius of curvature equation along different heights of its convexly rounded top surface.
Figure 17:
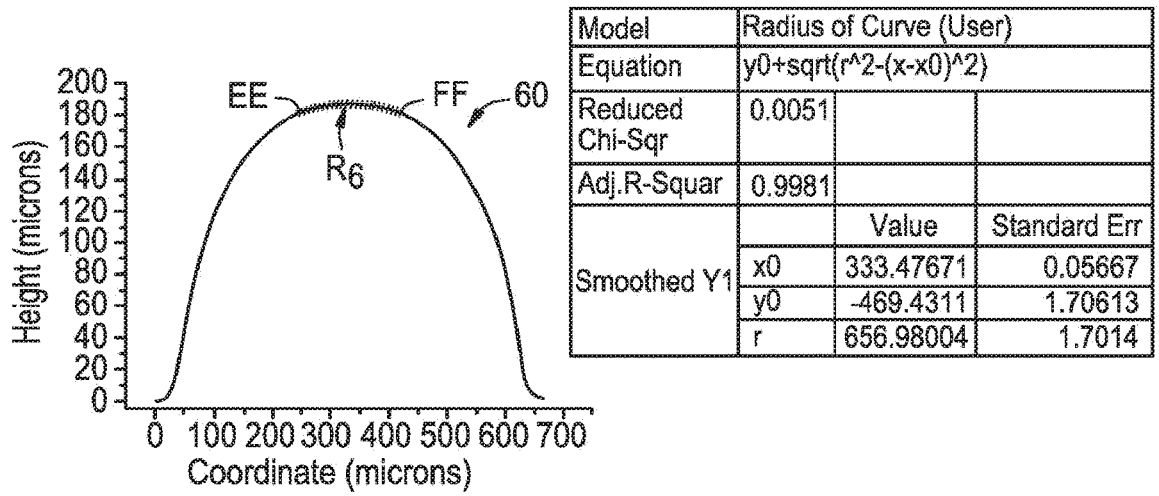
Figure 18:
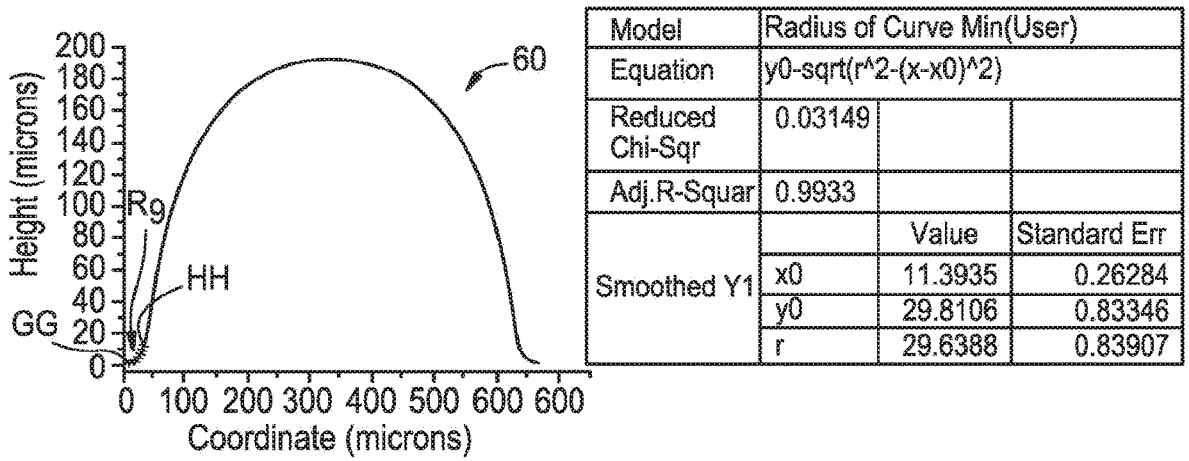
FIG. 18 is close-up cross-sectional view of an example hemispherical glass bump 60 fit with a radius of curvature equation along its concavely rounded side wall.
Figure 19:
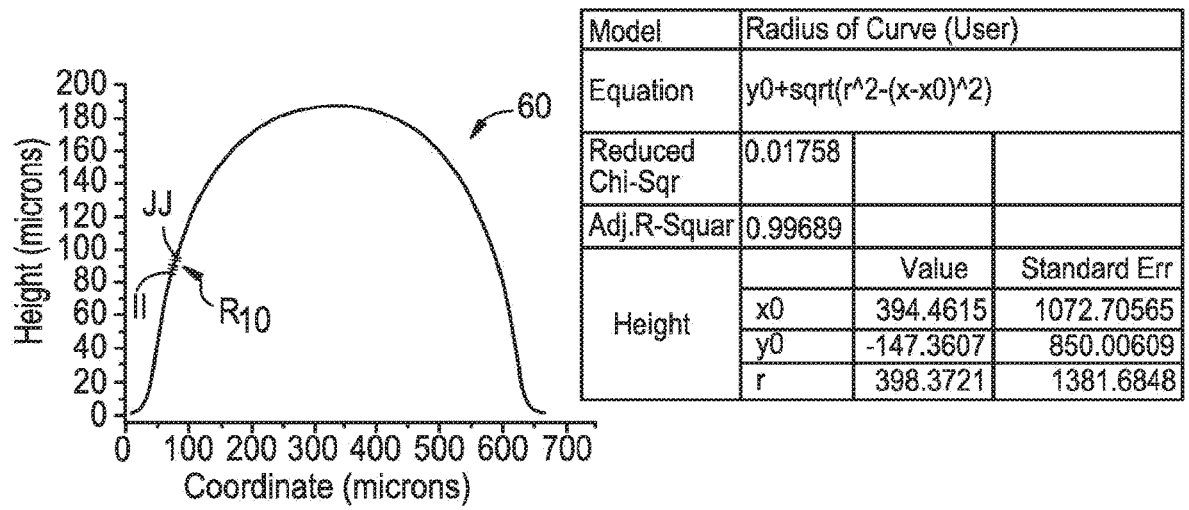
FIGS. 19-21 are close-up cross-sectional views of an example hemispherical glass bump 60 fit with a radius of curvature equation along different segments of one of its convexly rounded side walls.
Figure 20:
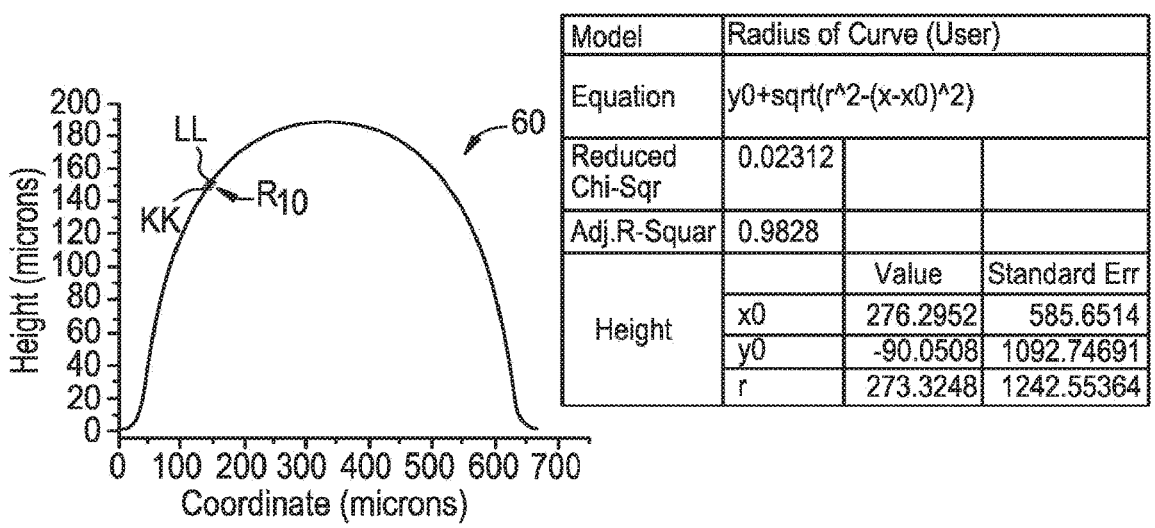
Figure 21:
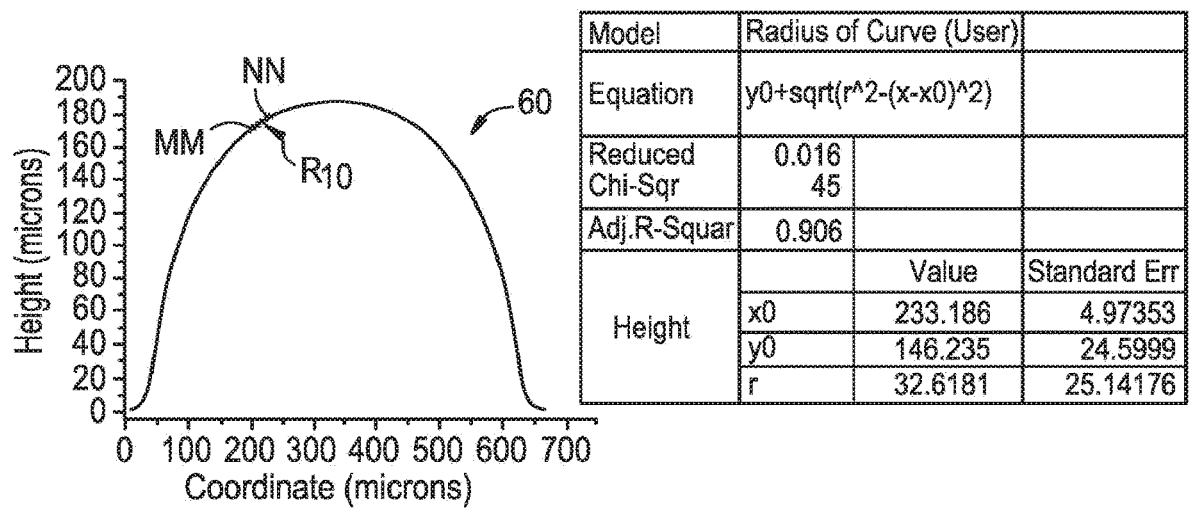

Referring again to FIG. 9, close-up cross-sectional view of hemispherical glass bump 60 is shown which is grown according to other conventional laser-irradiation methods. Glass bump 60 in FIG. 9 is further illustrated in FIGS. 16-21. Example glass bump 60 in FIGS. 16-21 have a height H60 of about 188 microns and a base diameter DB60 of about 666 microns. As shown in FIG. 16, glass bump 60 has a radius of curvature R6 of about 680 microns measured from coordinate CC at (286 microns, 186 microns) to coordinate DD at (382 microns, 186 microns) along glass bump 60 top surface. Radius R6 from coordinate CC to DD extends 1% of a height H60 of glass bump 60. As shown in FIG. 17, glass bump 60 has a radius of curvature R6 of about 656 microns measured from coordinate EE at (249 microns, 182 microns) to coordinate FF at (418 microns, 182 microns) along glass bump 60 top surface, Radius R6 from coordinate FE to FF extends 3% of height H60 of glass bump 60. As shown in FIG. 18, glass bump 60 has a radius of curvature R9 of about 30 microns measured from coordinate GG at (6 microns, 1 micron) to coordinate HH at (31 microns, 12 microns) along one of its concavely rounded sides. As shown in FIG. 19, glass bump 60 has a radius of curvature R10 of about 398 microns measured from coordinate II (71 microns, 85 microns) to coordinate JJ (77 microns, 93 microns) along one of its convexly rounded sides. As shown in FIG. 20, glass bump 60 has a radius of curvature R10 of about 273 microns measured from coordinate KK (143 microns, 148 microns) to coordinate LL (149 microns, 152 microns) along one of its convexly rounded sides. As shown in FIG. 21, glass bump 60 has a radius of curvature R10 of about 32 microns measured from coordinate MM (223 microns, 176 microns) to coordinate NN (229 microns, 180 microns) along one of its convexly rounded sides.

Table 1 below provides a comparison of various radii of curvature of glass bump 50 of the present disclosure against radii of curvature of glass bumps 60 and 70 formed according to conventional methods. As provided in Table 1, radius R1 of glass bump 50 is compared to similar radius R9 and R7 of glass bumps 60 and 70, respectively. Also, radius R2 of glass bump 50 is compared to similar radius R10 and R8 of glass bumps 60 and 70, respectively. Further, radius R3 of glass bump 50 is compared to similar radius R6 and R5 of glass bumps 60 and 70, respectively.

TABLE 1

Comparison of Glass Bump 50 of the present disclosure and Conventional Glass Bumps 60 and 70.

|  | Glass bump 50 | Glass bump 60 | Glass bump 70 |
| --- | --- | --- | --- |
| Concave radius of curvature for the concavely rounded sides | R1 (25 microns-100 microns) | R9 (25 microns-50 microns) | R7 (25 microns-50 microns) |
| Convex radius of curvature for the convexly rounded sides | R2 (200 microns-500 microns) | R10 (233 microns-398 microns) | R8 (643 microns-4047 microns) |
| Convex radius of curvature for the convexly rounded top surface (over 1-3% of the glass bump height H) | R3 (900 microns-2600 microns) | R6 (650 microns-680 microns) | R5 (3069 microns-4142 microns) |
| Concave radius of curvature for the concave area on the convexly rounded top surface | R4 (3500 microns-5000 microns) | N/A | N/A |

The convex radius of curvature R3 for the convexly rounded top surface (at 1-3% of top portion of glass bump height H50), R3, for glass bump 50 is 900-2600 microns. This radius of curvature R3 optimizes the contact between glass bump 50 and an opposing glass pane in a VIG window during increasing and decreasing pressure from the opposing pane on the convexly rounded top surface. As shown in Table 1 and described above, radius of curvature R3 for glass bump 50 is novel and inventive as compared to conventional glass bumps 60 and 70 used, for example, in VIG widows.

In one embodiment of the present disclosure, glass bumps 50 are formed by photo-induced absorption. Photo-induced absorption includes a local change of the absorption spectrum of a glass article resulting from locally exposing (irradiating), or heating, the glass article with radiation (i.e., laser irradiation). Photo-induced absorption may involve a change in adsorption at a wavelength or a range of wavelengths, including but not limited to, ultra-violet, near ultra-violet, visible, near-infrared, and/or infrared wavelengths. Examples of photo-induced absorption in the glass article include, for example, and without limitation, color-center formation, transient glass defect formation, and permanent glass defect formation. Laser irradiation dose is a function of laser power P and exposure time.

Figure 22:
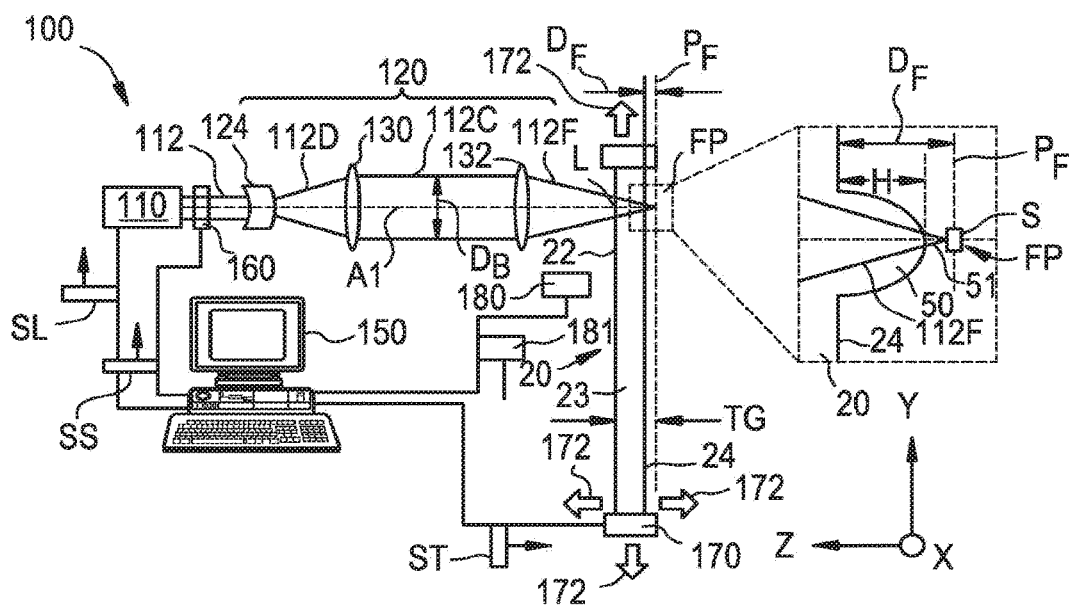
FIG. 22 is a schematic diagram of an example laser-based glass bump forming apparatus used to form glass bumps 50 in a glass article according to an exemplary embodiment.

FIG. 22 is a schematic diagram of an example laser-based apparatus ("apparatus 100") used to form glass bumps 50 in the glass article (e.g., glass pane 20). Apparatus 100 may include a laser 110 arranged along an optical axis A1. Laser 110 emits a laser beam 112 having power P along the optical axis A1. In an example embodiment, laser 110 operates in the ultraviolet (UV) region of the electromagnetic spectrum. Laser irradiation dose is a function of laser beam 112 power P and an exposure time.

Apparatus 100 also includes a focusing optical system 120 that is arranged along optical axis A1 and defines a focal plane PF that includes a focal point FP. In an example embodiment, focusing optical system 120 includes, along optical axis A1 in order from laser 110: a combination of a defocusing lens 124 and a first focusing lens 130 (which in combination forms a beam expander 131), and a second focusing lens 132. In an alternative embodiment, focusing optical system 120 includes, along optical axis A1 in order from laser 110: a beam expander 131 and a second focusing lens 132. Beam expander may be configured to increase or decrease the diameter of laser beam 112 by two times or four times to create collimated laser beam 112C with an adjusted diameter DB.

In an example embodiment, defocusing lens 124 has a focal length fD=−5 cm, first focusing lens 130 has a focal length fC1=20 cm, and second focusing lens 132 has a focal length fC2=3 cm and a numerical aperture NAC2=0.3. In an example embodiment, defocusing lens 124 and first and second focusing lenses 130 and 132 are made of fused silica and include anti-reflection (AR) coatings. In another embodiment, focusing lens 130 and/or 132 are aspherical lenses. In yet another embodiment, second focusing lens 132 has a numerical aperture NAC2=0.5. Alternate example embodiments of focusing optical system 120 include mirrors or combinations of mirrors and lens elements configured to produce focused laser beam 112F from laser beam 112.

Apparatus 100 also includes a controller 150, such as a laser controller, a microcontroller, computer, microcomputer or the like, electrically connected to laser 110 and adapted to control the operation of the laser. In an example embodiment, a shutter 160 is provided in the path of laser beam 112 and is electrically connected to controller 150 so that the laser beam can be selectively blocked to turn the laser beam "ON" and "OFF" using a shutter control signal SS rather than turning laser 110 "ON" and "OFF" with a laser control signal SL.

Prior to initiating the operation of apparatus 100, the glass article is disposed relative to the apparatus. Specifically, the glass article is disposed along optical axis A1 so that a surface of the glass article is substantially perpendicular to the optical axis A1. In an example embodiment, glass pane 20, including a front surface 22 and back surface 24, is disposed relative to optical axis A1 so that back glass pane surface 24 is slightly axially displaced from focal plane PF in the direction towards laser 110 (i.e., in the |Z direction) by a distance DF. In methods according to the present disclosure, distance DF may range from 0.1 millimeters to 3 millimeters. In an exemplary embodiment, distance DF may range from about 1 millimeter to about 2.5 millimeters. In yet another embodiment of forming glass bump 50, numerical aperture NAC2=0.3. In another example embodiment, glass pane 20 has a thickness TG in the range 0.5 millimeters≤TG≤6 millimeters. Using these parameters, glass bump 50 of the present disclosure is capable of being grown from glass pane 20. Conventional methods of forming glass bumps have not produced a glass bump with a top surface (along 1-3% of the top portion of its height) with a radius of curvature greater than 750 microns, or even, 900 microns, without the use of a growth limiting structure. Accordingly, when using a growth limiting structure, glass bumps 70 have a top surface radius of curvature R5 greater than 3000 microns. Accordingly, the above numerical aperture NAC2 and DF values result in glass bump 50 with novel geometric properties.

In an example method of operating apparatus 100, laser 110 may be activated via control signal SL from controller 150 to generate laser beam 112. If shutter 160 is used, then after laser 110 is activated, the shutter is activated and placed in the "ON" position via shutter control signal SS from controller 150 so that the shutter passes laser beam 112. Laser beam 112 is then received by focusing optical system 120, and defocusing lens 124 therein causes the laser beam to diverge to form a defocused laser beam 112D. Defocused laser beam 112D is then received by first focusing lens 130, which is arranged to form an expanded collimated laser beam 112C from the defocused laser beam. Collimated laser beam 112C is then received by second focusing lens 132, which forms a focused laser beam 112F. Focused laser beam 112F passes through glass pane 20 and forms a spot S along optical axis A1 at focal point FP, as mentioned above, is at a distance DF from glass pane back surface 24 and thus resides outside of body portion 23. The intersection between the converging laser beam 112F and glass pane 20 front surface 22 and back surface 24 is referred to herein as a locality L. Laser beam 112F may be focused on a different area of glass pane 20 to form another locality L.

A portion of focused laser beam 112F is absorbed as it passes through glass pane 20 (at locality L) due to the aforementioned photo-induced absorption in the glass pane. This serves to locally heat glass pane 20 at locality L. The amount of photo-induced absorption may be relatively low, e.g., about 3% to about 50%. The glass bump begins to form as a limited expansion zone is created within glass pane 20 body portion 23 in which a rapid temperature change induces an expansion of the glass. Since the expansion zone is constrained by unheated (and therefore unexpanded) regions of glass surrounding the expansion zone, the molten glass within the expansion zone is compelled to relieve internal stresses by expanding/flowing upward, thereby forming glass bump 50. If focused laser beam 112F has a circularly symmetric cross-sectional intensity distribution, such as a Gaussian distribution, then the local heating and the attendant glass expansion occurs over a circular region in glass pane body 23, and the resulting glass bump 50 may be substantially circularly symmetric.

The aforementioned process can be repeated at different locations (e.g., localities L) in the glass pane to form a plurality (e.g., an array) of glass bumps 50 in glass pane 20. In an example embodiment, apparatus 100 includes an X-Y-Z stage 170 electrically connected to controller 150 and configured to move glass pane 20 relative to focused laser beam 112F in the X, Y and Z directions, as indicated by large arrows 172. This allows for a plurality of glass bumps 50 to be formed by selectively translating stage 170 via a stage control signal ST from controller 150 and irradiating different locations in glass pane 20. In another example embodiment, focusing optical system 120 is adapted for scanning so that focused laser beam 112F can be selectively directed to locations in glass pane 20 where glass bumps 50 are to be formed.

As used herein, the singular forms "a," "an," and "the" include plural referents unless the context clearly dictates otherwise. Thus, for example, reference to a "metal" includes examples having two or more such "metals" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of making a glass article, the method comprising:
  irradiating a glass pane surface with laser radiation for a time to locally heat and induce growth of a glass bump from the glass pane surface, wherein:
    the laser radiation is directed from a laser radiation source through a focusing optical system, wherein the focusing optical system comprises a focusing lens with a numerical aperture of from 0.01 to 0.5;
    the laser radiation converges at a distance from 1 millimeter to 2.5 millimeters away from the glass pane surface opposite the laser irradiation source; and
    the method is free of a glass bump growth-limiting structure;
  wherein the glass bump formed by irradiating the glass pane surface comprises, a lower region comprising a diameter D1 defined by concavely rounded sides, wherein the lower region projects from the glass pane surface, wherein the diameter D1 is a maximum diameter of the glass bump, wherein the concavely rounded sides have a radius of curvature R1 and join with the glass pane surface; and an inflection region connecting the lower region of the glass bump and an upper region of the glass bump, wherein;

the upper region of the glass bump comprises a transition portion and a top portion;

the transition portion comprises a diameter D2 defined by convexly rounded sides, wherein the convexly rounded sides have a radius of curvature R2, and wherein the diameter D2 is less than the diameter D1; and the top portion comprises a diameter D3 defined by a convexly rounded top surface, the convexly rounded top surface joining with the convexly rounded sides converging from the transition portion, wherein the convexly rounded top surface has a radius of curvature R3 within a predetermined range of no less than 900 microns to no greater than 2600 microns, where the radius of curvature R3 is greater than the radius of curvature R2, wherein the diameter D3 is less than the diameter D2, wherein the convexly rounded top surface is spaced apart from the glass pane surface defining a height H of the glass bump; and wherein the convexly rounded top surface includes a concave radius of curvature R4 within the radius of curvature R3; or the convexly rounded top surface of the top portion includes a concave area; or the radius of curvature R1 of concavely rounded sides of the lower region is from 25 microns to 100 microns, and the radius of curvature R2 of the convexly rounded sides of the transition portion is from 175 microns to 950 microns over at least 5% of the glass bump height H; or a combination thereof.

2. The method of claim 1, the laser radiation comprises an ultraviolet wavelength.

3. The method of claim 1, wherein the numerical aperture of the focusing lens of the focusing optical system is from 0.01 to 0.3.

4. The method of claim 1, wherein the numerical aperture of the focusing lens of the focusing optical system is from 0.3 to 0.5.

5. The method of claim 1, wherein the focusing optical system comprises a defocusing lens, a first focusing lens, and a second focusing lens, wherein the second focusing lens is the focusing lens of the focusing optical system with a numerical aperture of from 0.01 to 0.5.

6. The method of claim 5, wherein the defocusing lens, the first focusing lens, and the second focusing lens each comprise an anti-reflective coating.

7. The method of claim 5, wherein the first focusing lens and the second focusing lens each comprise an aspherical lens.

8. The method of claim 1, further comprising a shutter positioned between the laser irradiation source and the focusing optical system.

9. The method of claim 1, wherein the glass article comprises a thickness of from 0.5 mm to 6 mm.

10. The method of claim 1, wherein:
the diameter D1 of the lower region is from 400 microns to 800 microns; and
the diameter D2 of the transition portion decreases from the inflection region to the top portion by 15% to 65%.

11. The method of claim 1, wherein:
the diameter D2 of the transition portion is from 132 microns to 680 microns;
the diameter D3 of the top portion is from 132 microns to 264 microns; and
the glass bump height Ft is from 50 microns to 200 microns.

12. The method of claim 1, wherein:
the lower region is from 5% to 25% of glass bump height H;
the upper region is from 75% to 95% of glass bump height H; and
the top portion is from 1% to 3% of glass bump height H.

* * * * *

UNITED STATES PATENT AND TRADEMARK OFFICE
CERTIFICATE OF CORRECTION

| | |
|---|---|
| PATENT NO. | : 11,247,939 B2 |
| APPLICATION NO. | : 16/526472 |
| DATED | : February 15, 2022 |
| INVENTOR(S) | : Masters et al. |

It is certified that error appears in the above-identified patent and that said Letters Patent is hereby corrected as shown below:

In the Claims

In Column 12, Line 67, in Claim 1, delete "comprises," and insert -- comprises --.

In Column 13, Line 10, in Claim 1, delete "wherein;" and insert -- wherein: --.

In Column 14, Line 35, in Claim 11, delete "Ft" and insert -- H --.

Signed and Sealed this
Twentieth Day of September, 2022

Katherine Kelly Vidal
*Director of the United States Patent and Trademark Office*